US005625881A

United States Patent [19]

Sandler et al.

[11] Patent Number: 5,625,881
[45] Date of Patent: Apr. 29, 1997

[54] TIME AND FREQUENCY DIVERISTY IN A RADIO SYSTEM HAVING INTERMITTENT OPERATION RECEIVERS

[75] Inventors: Howard M. Sandler; Leo Strawczynski, both of Ottawa, Canada; Shirish A. Altekar, La Jolla, Calif.

[73] Assignee: Bell-Northern Research Ltd., Ottawa, Canada

[21] Appl. No.: 234,361

[22] Filed: Apr. 28, 1994

[51] Int. Cl.$^6$ .................................................. H04B 7/02
[52] U.S. Cl. ........................... 455/38.3; 455/59; 455/65; 455/103; 455/343
[58] Field of Search .................................. 455/59, 63, 65, 455/101, 102, 103, 104, 105, 7, 9, 10, 18, 61, 277.1, 278.1, 279.1, 343, 38.3; 375/267; 340/825.44

[56] References Cited

U.S. PATENT DOCUMENTS

| | | | |
|---|---|---|---|
| 3,665,395 | 5/1972 | Bochmann | 375/267 X |
| 4,964,121 | 10/1990 | Moore | 455/343 |
| 5,095,535 | 3/1992 | Freeburg | 455/65 X |
| 5,203,018 | 4/1993 | Hirose | 455/61 |
| 5,280,631 | 1/1994 | Nakahi et al. | 455/65 |
| 5,305,353 | 4/1994 | Weerackody | 375/267 X |
| 5,437,055 | 7/1995 | Wheatley, III | 455/52.3 X |

FOREIGN PATENT DOCUMENTS

| | | |
|---|---|---|
| 4021636 | 1/1991 | Germany . |
| 2221820 | 2/1990 | United Kingdom . |
| 2237706 | 5/1991 | United Kingdom . |

OTHER PUBLICATIONS

Parsons, "Field–Diversity Antenna For U.H.F. Mobile Radio", *Electronics Letters*, vol. 10, No. 7, pp. 91–92, (1974).
Connors, "Error Controlled Diversity Combiner", *IBM Technical Disclosure Bulletin*, vol. 7, No. 5, pp.371, (1964).
Wu et al., "An Error Control Scheme with Two Frequency Hopping and Half Rate Code for Indoor Radio Systems", 16th Bi–ennial Symposium on Communications at Queens' University, Ontario, Canada, pp. 13–16.

*Primary Examiner*—Reinhard J. Eisenzopf
*Assistant Examiner*—Philip J. Sobutka
*Attorney, Agent, or Firm*—Foley & Lardner

[57] ABSTRACT

The invention provides a means by which a radio system in a multipath propagation environment may improve the probability of successful reception of a message by the application of diversity. It is applicable to such applications as paging, cordless telephones, cellular telephones, and radio identification tags. The transmitter sends the message repeatedly, each repetition transmitted from a different antenna. The antennas are separated so that multipath fading of the signal arriving at the receiver from each transmit antenna is substantially uncorrelated with the multipath fading of the signal arriving at the receiver from the other transmit antennas. The receiver examines the radio channel for an incoming message for a time period long enough for it to potentially receive the message from each antenna. Even if the message sent from one antenna is faded such that it cannot be received successfully at the portable receiver, the likelihood is that the message will be successfully received when it is transmitted from another antenna.

2 Claims, 9 Drawing Sheets

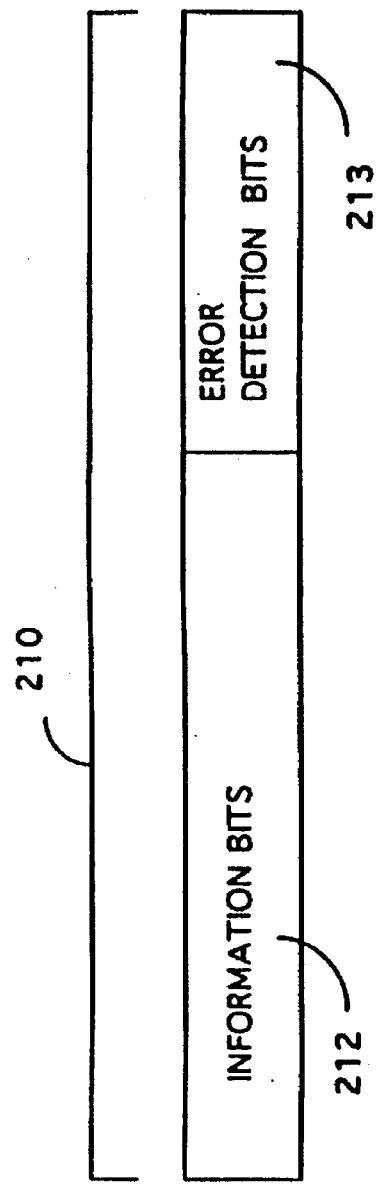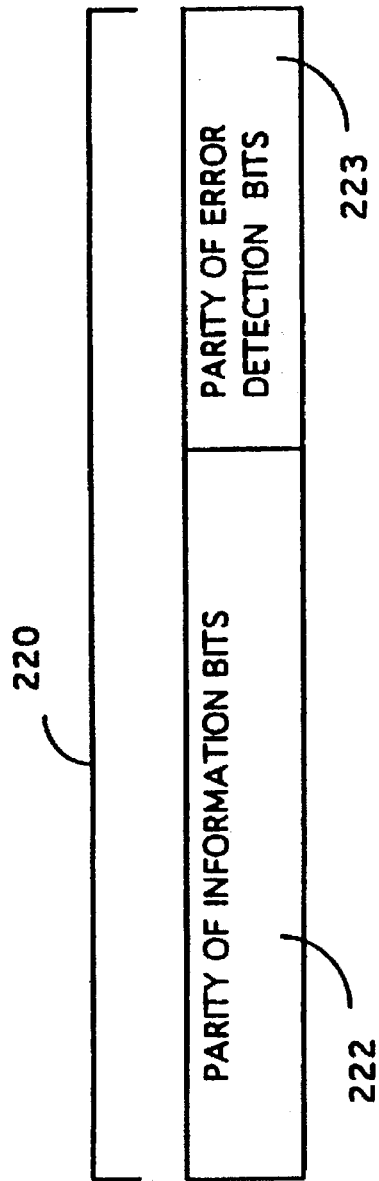

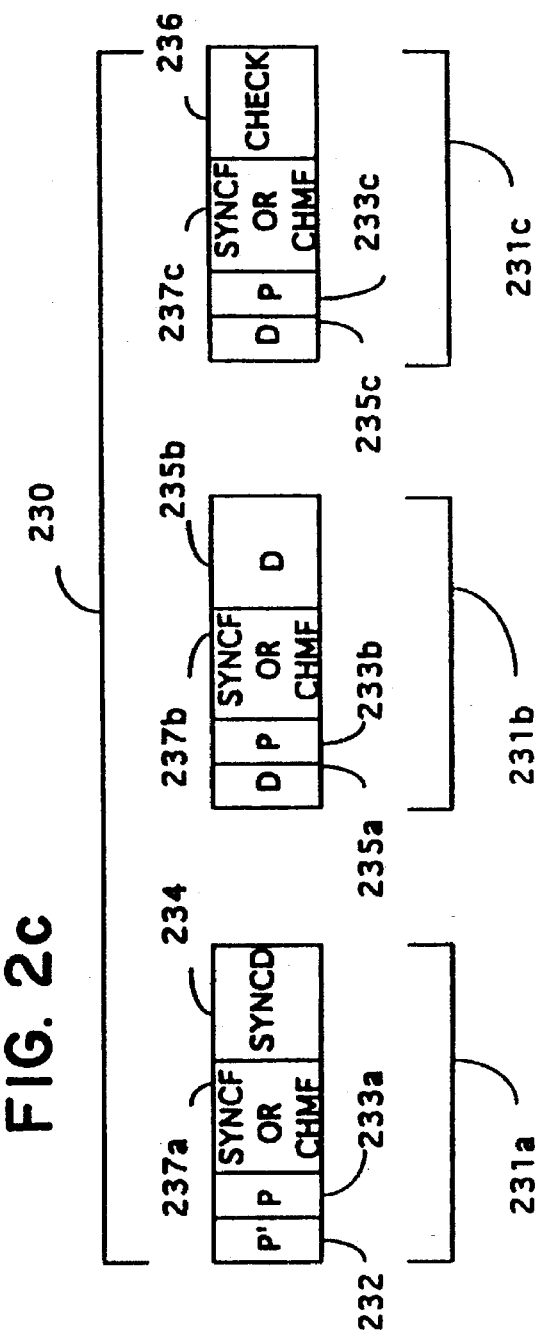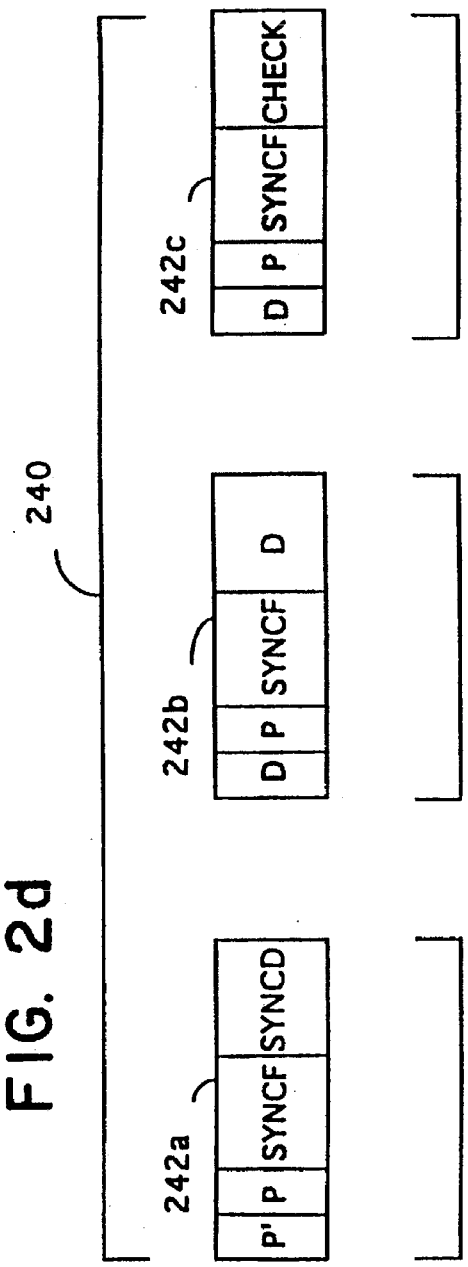

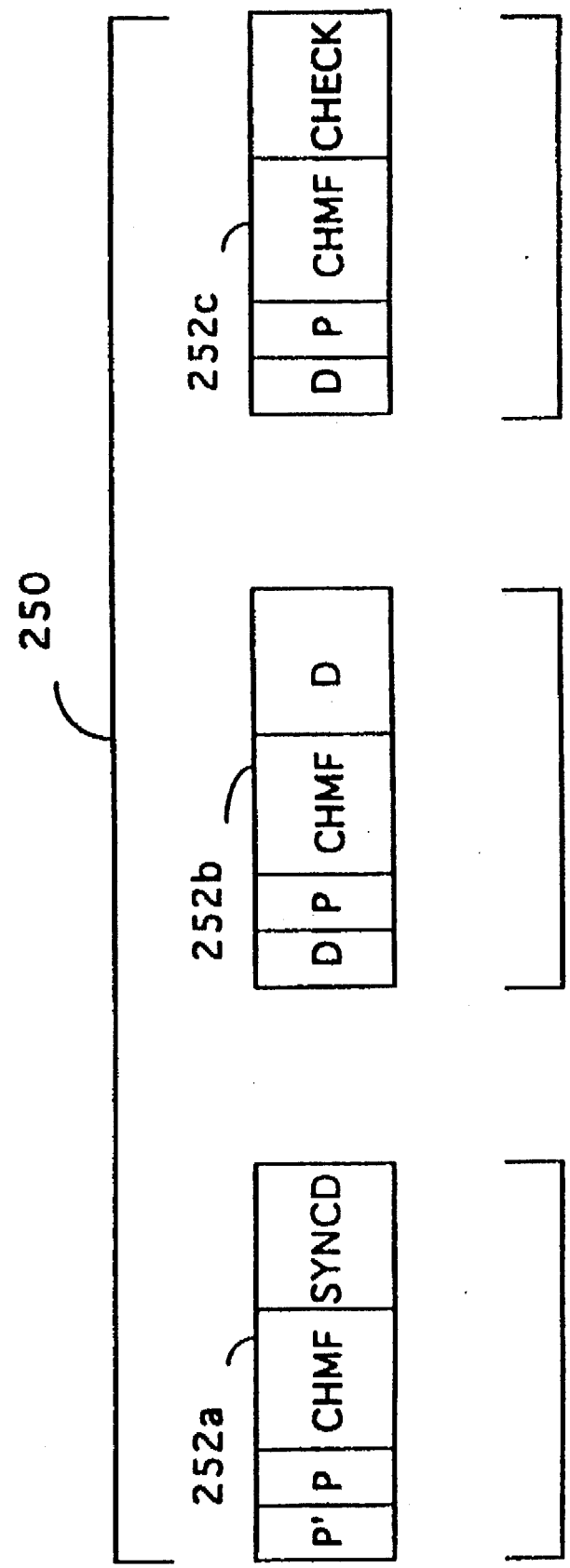

TIME AND FREQUENCY DIVERISTY IN A RADIO SYSTEM HAVING INTERMITTENT OPERATION RECEIVERS

FIELD OF THE INVENTION

This invention relates to radio communication systems in which messages are transmitted in a multipath or uncertain propagation environment.

DESCRIPTION OF THE PRIOR ART

Radio propagation in a cluttered indoor or outdoor environment is often affected by multipath fading. Fading occurs because the signal sent by the transmitter may travel by several different paths to the receiver, e.g. a direct ray, a ray reflected from a wall, a ceiling or by an object in the vicinity. Since the rays arrive with different phases at the receiving antenna, they may add either constructively or destructively. Fading occurs when the rays add destructively. A receiving antenna placed in different positions in this environment will measure a received signal strength which varies according to whether the wave addition at a given position is constructive or destructive.

In paging systems, multipath fading is a well known problem. Messages are transmitted from a central base station to portable receivers or pagers, often through multipath channels. Thus, there is a certain probability that the paging message will be received in error. The likelihood that a message is received in error is related to the probability that the pager's receiving antenna is placed in a position which is in a fade with respect to the transmitting antenna at the time the paging message is sent.

The distance between a position of destructive addition, and a position sufficiently removed from it such that the degree of fading is uncorrelated with that at the first position is about one quarter of a wavelength. This is valid for an environment with nearby clutter; i.e. the fading of signals measured at positions with this separation is essentially statistically independent. At frequencies in the 900 MHz region, the required separation in a cluttered environment is only a few centimeters. Thus, one solution to the multipath fading problem is to place two antennas and receivers in the pager, with sufficient separation of the antennas to ensure that if one receives the message in error because it is in a fade, the other probably will not be in a fade. This is known as antenna or space diversity. However, because of the need for a small and light package, pagers generally cannot incorporate more than one antenna and receiver.

In radio base stations, the use of multiple antennas is less problematic. An example of a radio system which makes use of base stations with antenna diversity is the CT2 (second generation digital cordless telephone) system. Such a system is described in a copending patent application entitled "Antenna Diversity Reception in Wireless Personal Communications" filed Sep. 25, 1992 and having Ser. No. 07/950,513. In CT2, both the base-to-portable and portable-to-base transmissions use the same carrier frequency. Information bits are sent in one direction in a 1 ms burst, followed by a 1 ms burst in which information bits are sent in the other direction, thus defining a 2 ms frame. Antenna diversity may be employed in the following manner. The base station contains two antennas, each connected to a receiver. On the portion of the frame in which the base receives a transmission from a portable, signal bursts are received at both base station antennas. The base station measures the signal strength of signals received at each antenna, and selects the signal which is strongest (i.e. it selects the antenna which is not experiencing a fade). During the next portion of the frame, during which the portable receives, the base station transmits using the selected antenna. This assures that the signal received by the portable terminal will be strong as well, because of the reciprocity principle of electromagnetics which states that the path loss between two antennas is the same regardless of the direction of transmission.

The problem with this approach is that until a two-way link has been established to the portable terminal, no measure exists to combat multipath fading in the base-to-portable direction. For example, when a call arrives at the base station from the telephone network, the base station must send an alerting message to the portable terminal in order to start a link. In this case, the radio base station has not yet received a signal from the portable terminal to judge which one of its two antennas is to be used. The base station is therefore unable to invoke the diversity feature described above unless the portable responds. At this point, the problem is identical to the paging problem described above. Thus, in this scenario, the effective range of the cordless telephone system in the alerting or paging mode is in fact less than the effective range of the system in the call progress mode wherein antenna diversity is used.

Another solution which has been proposed to reduce multipath fading problems is the use of frequency diversity. With this technique, a single antenna is used by the transmitting station. However, a first burst is transmitted on one frequency and the next burst is transmitted on a second frequency. A frequency diversity scheme is disclosed at pages 13–16 of a paper by Wu et. al. entitled "An Error Control Scheme with Two Frequency Hopping and Half Rate Code for Indoor Radio Systems" presented at the 16th Bi-ennial Symposium on Communications at Queens' University, Ontario, Canada.

Even in an environment without multipath propagation, there can be uncertainty in the path loss between a transmitter and receiver. For example, radio identification tags which transmit an identification message can be oriented randomly with respect to a fixed receiver. If the transmitter's antenna is oriented such that it's radiation pattern has a null in the direction of the receiver, then the message may not be received with sufficient strength to be error-free at the receiver.

Accordingly, there is a need for minimizing errors of messages which are directed to communication devices which contain only one antenna and receiver and which operate in various multipath or uncertain propagation environments.

SUMMARY OF THE INVENTION

It is therefore an object of the present invention to provide an improved method for sending radio messages in a multipath propagation environment from a transmitter to a receiver, especially a portable receiver, wherein the receiver contains only one antenna and one receiving circuit.

Another object of the present invention is to provide an improved method of sending paging messages such that when received, the paging messages will have a probability of error comparable to that which would have been available with multiple antennas and receivers even when the transmitter and receiver are randomly-oriented.

The method of the invention requires that the receiver monitor the channel for a time period long enough to potentially receive at least two transmissions of a message. The message is assumed to contain error detection parity bits, such as a cyclic redundancy check, from which the receiver can tell if the message has been received in error. The transmitter sends the message from a first transmitting antenna. It then re-transmits the message from a second transmitting antenna. The second transmitting antenna is placed a suitable distance away from the first transmitting antenna such that the fading of the signal at the receiving antenna with respect to the first transmitting antenna is substantially statistically independent of the fading of the signal at the receiving antenna with respect to the second transmitting antenna.

In another embodiment of the invention, the transmitter sends the message from a first transmitting antenna and then re-transmits the message from a second transmitting antenna, which are arranged, such that the two transmitting antennas are cross-polarized. Fading from cross polarized antennas tends to be statistically independent in a multipath environment. Also, if one transmitting antenna has a null in its radiation pattern in the direction and polarization of the receiving antenna, the other may not.

In yet another embodiment of the invention, a message containing user information and a synchronization pattern is sent on one antenna and a second message containing the same pattern with different user information is sent on a second antenna.

BRIEF DESCRIPTION OF THE DRAWINGS

FIG. 2a is an illustration of a message field containing information bits;

FIG. 2b is an illustration of a message field containing parity bits for either error detection or error correction;

FIG. 2c is an illustration of a message field used in a CT2 system;

FIG. 2d is an illustration of the message field of FIG. 2c when the radio base station operates in the idle mode;

FIG. 2e is an illustration of the message field of FIG. 2c when the radio base station operates in the alerting or paging mode;

DESCRIPTION OF THE PREFERRED EMBODIMENT

Figure 1A:
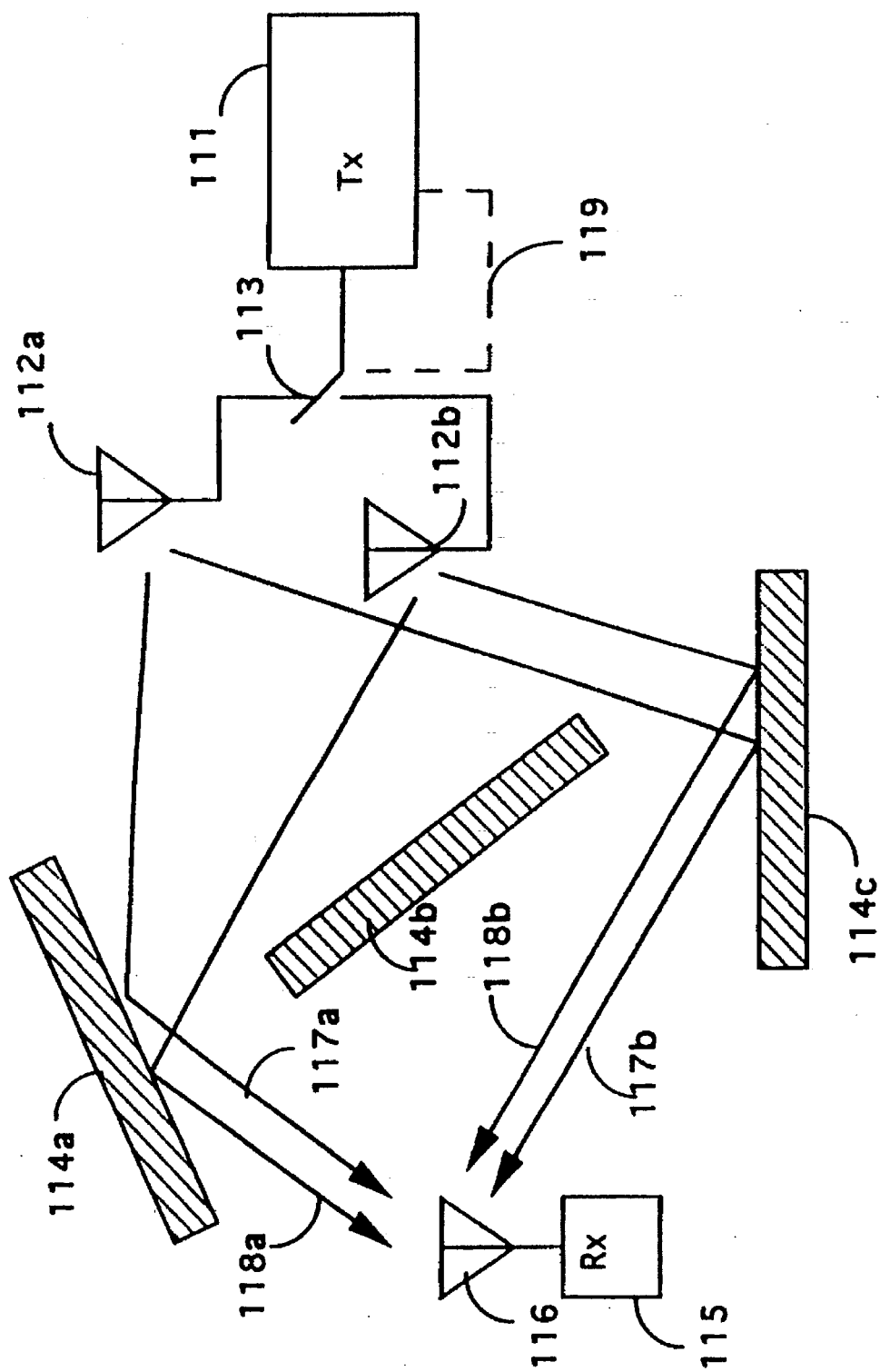
FIG. 1a is an illustration of a radio system employing antenna diversity in accordance with a first embodiment of the invention.

In the illustration of FIG. 1a, a radio system operating in a multipath propagation environment is shown. The transmitter 111 can be connected to one of two antennas 112a or 112b via a radio frequency switch 113. The switch can be electrically controlled via a control line 119 so that rapid switching is possible. The antennas 112a and 112b are separated by a suitable distance such that the fading at the receiving antenna 116 of the receiver 115 is substantially statistically independent with respect to the two transmitting antennas.

That is, let p be the probability that the signal transmitted from any one transmitting antenna fades to the point where the message is received in error at the receiver. Then, since the fading is independent from the two transmitting antennas, the probability that the message is received in error when sent twice on paths with statistically independent fading is $p^2$. As p is generally much less than one, the reduction in error rate can be quite significant.

The method can be extended to the use of n transmitting antennas. In the general case, for n independent fading paths, the probability of error decreases to $p^n$.

If the system operates in a multipath propagation environment, transmitted signal components 117a and 117b from antenna 112a encounter objects 114a, 114b and 114c in the environment and arrive via different paths at the receiving antenna. The net signal strength at the receiver resulting from the transmission from antenna 112a may be low (faded) if the components 117a and 117b add out of phase (destructive addition). In this case, the message transmitted from antenna 112a may be received in error. According to the first embodiment of the invention, the message is repeated from antenna 112b after having been sent from antenna 112a. In this case, the received signal components 118a and 118b may or may not add destructively at the portable receiver's antenna. If the probability of destructive addition to the extent that an error would be caused is p, and if antennas 112a and 112b are separated such that fading from signals sent by them is statistically independent over space, then, as indicated above, the probability that both transmissions of the message are received in error reduces to only $p^2$.

Although this diagram depicts the use of only two antennas, the extension to more than two antennas will be understood to those skilled in the art.

Figure 1B:
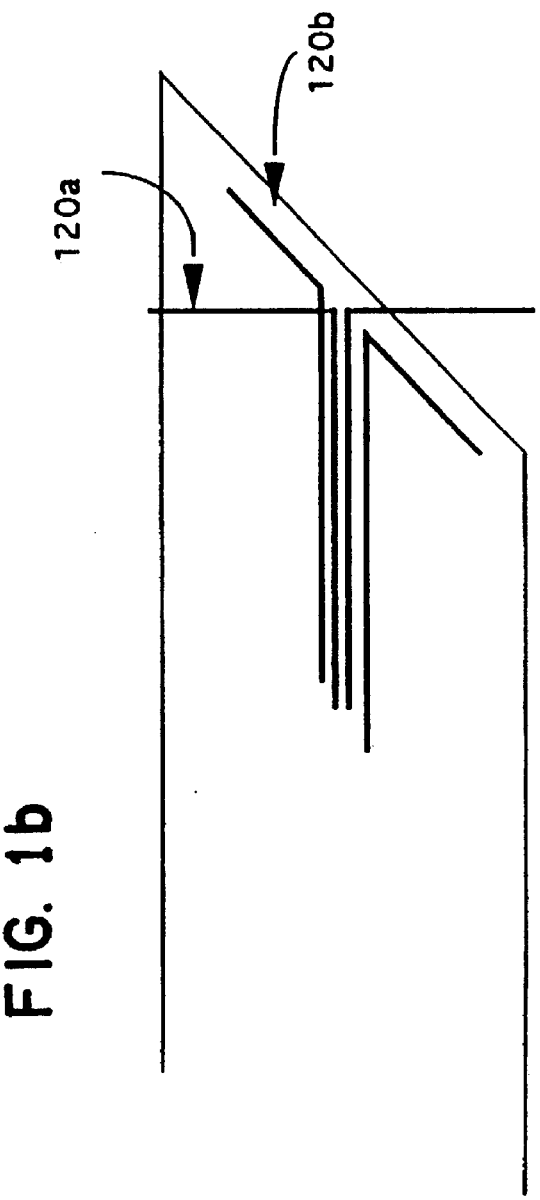
FIG. 1b is an illustration of cross polarized antennas for providing antenna diversity, according to a second embodiment of the invention.

In the embodiment shown in FIG. 1b, the transmitting antennas 120a and 120b are cross-polarized. In this embodiment, antenna 120a is a dipole antenna oriented vertically, while antenna 120b is a dipole antenna oriented horizontally. The two cross-polarized antennas 120a and 120b could also physically be a single antenna structure with cross-polarized feed terminals. In the case of cross-polarized antennas, spatial separation is unnecessary, as components emanating from different polarizations fade in an independent manner in a cluttered environment. However, in the case when more than two transmitting antennas are desired, both cross-polarization and spatial separation could be employed.

Figure 1C:
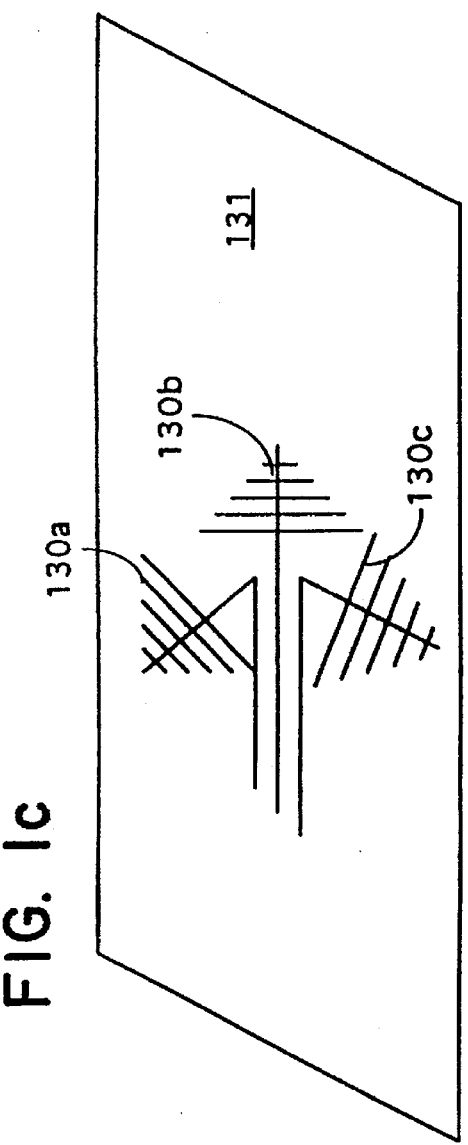
FIG. 1c is an illustration of a typical antenna structure providing angle diversity, according to another embodiment of the invention.

In the embodiment of FIG. 1c, the transmitting antennas 130a, 130b and 130c are set-up to provide angle diversity. That is, given a horizontal plane 131, each antenna can transmit and receive within a specified angular sector. In this example, each antenna transmits and receive within a 120 degree sector. It will of course be understood to those knowledgeable in the art, that the number of sectors can vary to accommodate traffic densities in the area.

Figure 1D:
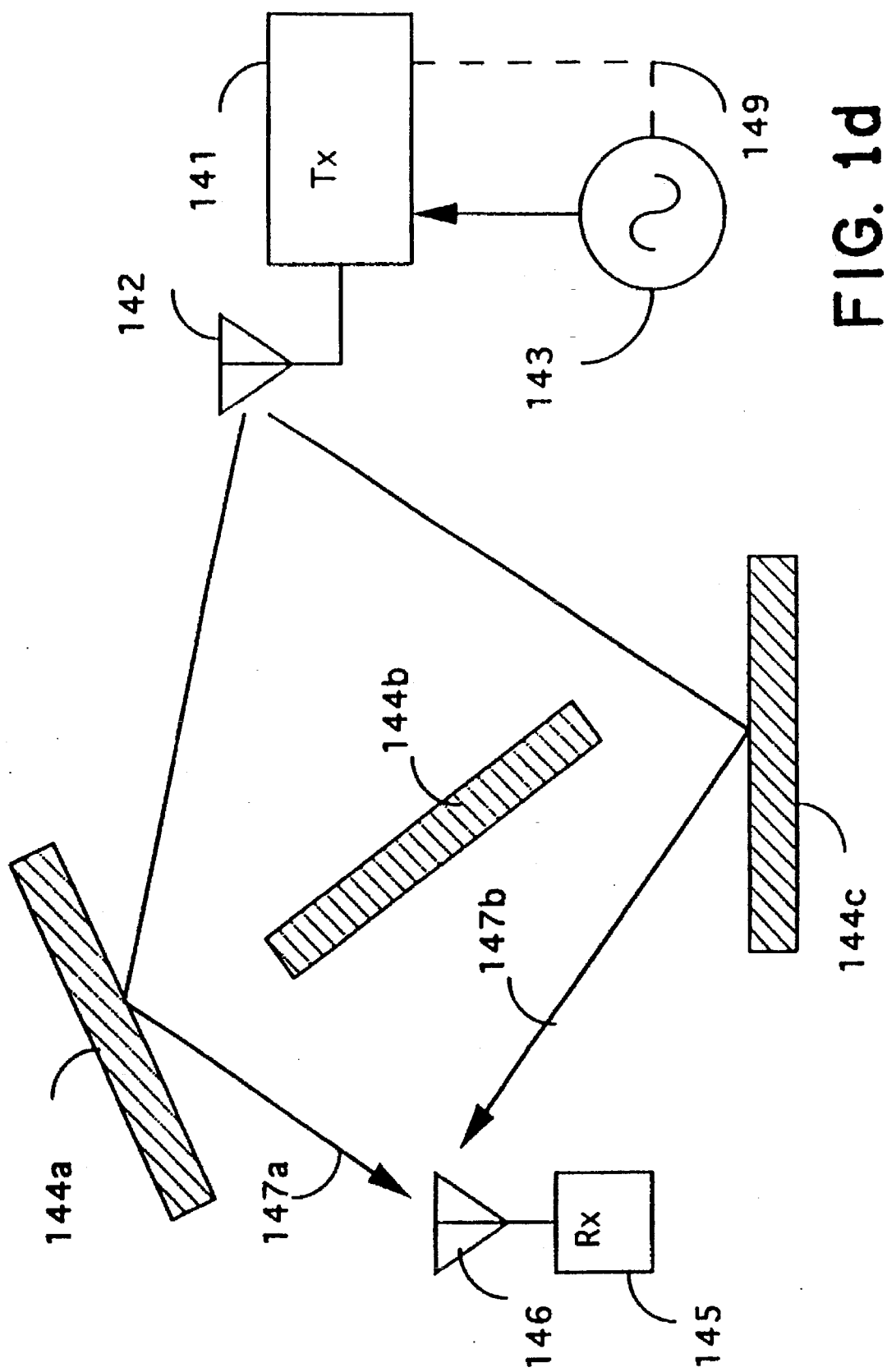
FIG. 1d is an illustration of a prior art radio system employing frequency diversity.

In FIG. 1d, frequency diversity, rather than antenna diversity is employed. The transmitter 141 produces a transmitted signal modulated on any one of several carrier frequencies produced by a frequency source 143. The frequency source is controlled by control line 149 to switch between a number of different carrier frequencies. The transmitter transmits the message on a first carrier frequency from a single transmitting antenna 142. Transmitted signal components from antenna 142 encounter objects 144a, 144b and 144c in the environment and travel via paths 147a and 147b to the receiving antenna 146 where they add either constructively or destructively to produce a received signal for the receiver 145. It may be that the components arriving on paths 147a and 147b add destructively when sent on the first carrier frequency and the message is not successfully received. After sending the message on the first carrier frequency, the transmitter sends the message again, this time on a second carrier frequency sufficiently removed from the first carrier frequency that the phases of the signal components arriving at the receiving antenna are sufficiently changed that their sum is uncorrelated with the value it had when the first carrier frequency was used. In this case, it may be that the components now add constructively instead of destructively and the message is likely to be received successfully in accordance with the probability described above for antenna diversity. The extension of this method to n carrier frequencies is straightforward.

In another embodiment of the invention, frequency and antenna diversity are combined to provide a multiplicity of sequentially transmitted independently fading signals. In this instance, a message is sent via a first antenna on a first carrier frequency. The message is then re-transmitted, this time on a second antenna on the first carrier frequency. The message is then re-transmitted, yet again, this time on the first antenna, but on a second carrier frequency. The message is then re-transmitted, yet again, on the second antenna and the second carrier frequency.

FIG. 2a depicts a message structure suitable for use with the invention. The message 210 is composed of information bits 212 and error detection bits 213. On receipt of a message, the receiver 115 (see FIG. 1a) determines if the received error detection bits are consistent with the received information bits, according to a prescribed algorithm, such as a cyclic redundancy check. This check allows the receiver to determine if the received information bits are correct.

In the embodiments described in conjunction with FIGS. 1a, b, c and d, the messages which are sequentially transmitted are identical. In another embodiment of the invention, at least one of the sequentially transmitted messages is coded. The coded version of the message is depicted in FIG. 2b. The coded version 220 of the message is generated from the primary message 210 according to a rate one-half block forward error correcting code. The code can be described as a (j,k) code where j is the number of bits in the code, k is the number of information bits, and j−k is the number of parity bits. There is a 1:1 relationship between the information and parity bits. In the case of a rate ½ code, j is equal to 2k and the coding process generates as many parity bits as original message bits. In this embodiment, the parity bits for the information bits 222 are generated by one encoding operation, and the parity bits for the error detection bits 223 are generated by a separate encoding operation. If the portable terminal receives the message 210 in error, it can still recover the information bits 212 if the coded version of the message 220 is received error-free. This gives the same performance as if the message 220 was simply transmitted twice on different antennas or frequencies. However, even if both the message 210 and the coded version of the message 220 are received in error, the forward error correction algorithm may be able to correct the errors to recover the transmitted message error-free. This gives improved performance with respect to simply repeating the message twice.

In the most general case, a total of n−1 coded versions of the message are produced using a rate 1/n block forward error correction code, thus producing n different versions of the message when taken together with the original message, to be sent sequentially as n independently fading signals.

Note that simple repetition of the message, i.e. the coded versions being identical to the original version, can be considered to be an error correcting code if three or more transmissions of the message are received. In this case, majority logic applied on a bit-by-bit basis across the received signals is the decoding process which is used to estimate the correct bits. For example, if the message is received three times, and a certain bit position in the message contains a logic '1' in two cases, but a logic '0' in a third case, then the decoder's estimate of the correct value for that bit is a logic '1'.

FIG. 2c shows a message structure used in CT2 systems. In the CT2 environment, a message 230 is sent in three bursts 231a, 231b and 231c. Each burst is of 1 ms. in duration and is separated by a null of 1 ms. Each burst contains 66 bits. The first burst 231a begins with a 16-bit P' field 232, which contains a 1 and 0 bit reversal pattern to aid in clock recovery. Each burst further contains a 10 bit P field 233a, 233b and 233c, containing more of the 1 and 0 bit reversals to aid clock recovery. The first burst ends with a 16-bit SYNCD field 234 which is a fixed pattern to mark the start of a message. The second and third bursts contain three 16-bit D channel fields 235a, 235b and 235c which contain user information. The last burst ends with a 16-bit check field 236 which contains a checksum calculated on the three D fields 235a, 235b and 235c for error detection.

Each burst further contains a 24-bit field 237a, 237b and 237c which contains one of two fixed 24-bit synchronization patterns, known as SYNCF or CHMF. These are used to provide frame synchronization and also to distinguish the paging state, where a base station is attempting to set up a link to a portable receiver (CHMF transmitted) from either the idle state or the 2-way communication state (SYNCF transmitted).

Referring now to FIGS. 2d and 2e, we have shown the message structure of FIG. 2c when the radio base station is operating in the idle mode, FIG. 2d and when the radio base station is operating in the alerting or paging mode, FIG. 2e. When used with the method of the present invention, the idle mode message structure 240 of FIG. 2d is sent on one antenna and is repeated on a second antenna. This pattern of sending the idle mode message alternately on one antenna and then the other would then continue until the base station needed to send some other type of message. This allows a mobile station to enter the cell area where the base station is located and determine that service is available. It might then, for example, send a location registration message to the base station to indicate its presence in the cell in order to be able to receive calls. In the paging mode, the message structure 250 of FIG. 2e is sent on one antenna and another message containing the same synchronization field CHMF is sent on another antenna. More specifically, when the radio base station operates in an idle mode, i.e. is not communicating with a particular mobile station, the message 240 is transmitted on one antenna with the synchronization pattern SYNCF 242a, 242b and 242c, the P and P' fields and subscriber information D fields. The message is then repeated on another antenna. The D fields in this mode contain information for any new subscriber entering the cell about the service operator, and the D fields are identical for each repetition. When the radio base station goes to an alerting or paging mode, the message is of the form shown in FIG. 2e, wherein the message is first transmitted by the base station on one antenna, with the synchronization pattern CHMF sent in each field 252a, 252b and 252c. The D-channel fields contain an alerting message intended for a specific portable receiver. A different message is then transmitted by the base station on another antenna. In the retransmission, the synchronization pattern CHMF is repeated again in field 252a, 252b and 252c, but the message sent in the D-channel fields is different from the message previously sent on the first antenna.

The portable receiver thus has the opportunity to see the synchronization pattern CHMF sent from two different transmitting antennas, although it only sees each D-channel message from one antenna. The presence of CHMF, rather than SYNCF as the synchronization pattern, conveys information to the portable receiver, for example, it conveys to the receiver that paging is taking place, and that the portable receiver should take a specific action, such as monitoring other channels.

The CHMF synchronization pattern 252a, 252b and 252c therefore can be considered to be a 1-bit "message" with redundancy (23 bits) for error detection.

Figure 3A:
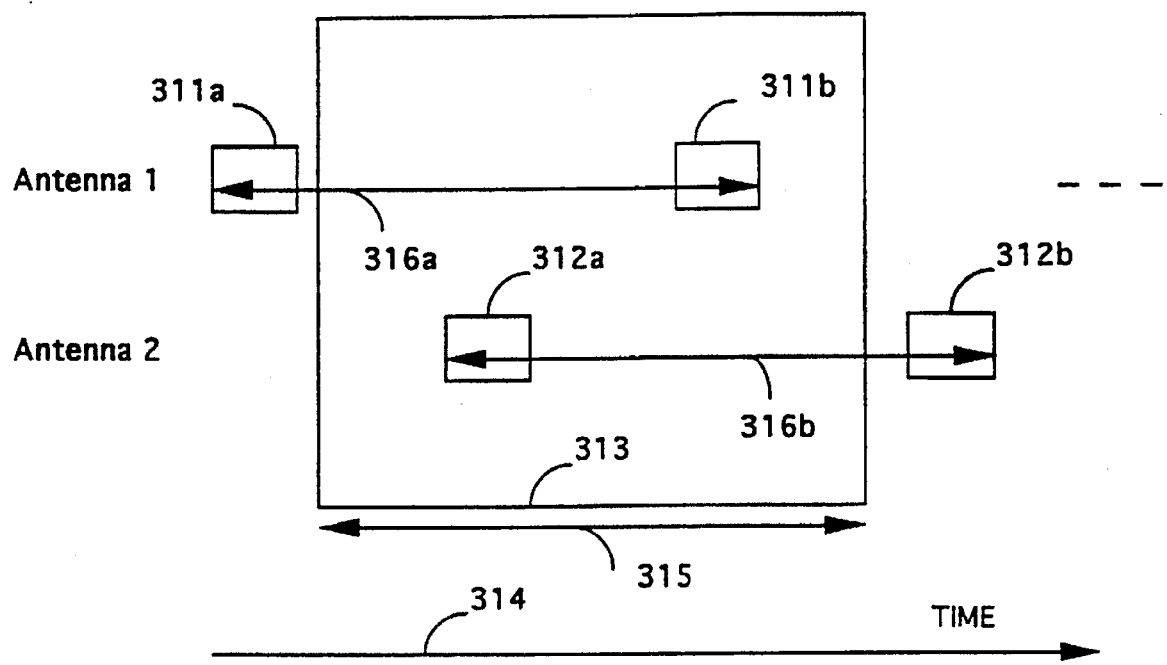
FIG. 3a is a timing diagram depicting the timing relationships between messages when using antenna diversity.

FIG. 3a shows the necessary timing relationship between transmitter and receiver for the embodiment where the message is repeatedly transmitted from alternate antennas. In the diagram, the horizontal dimension 310 represents time. Both the transmitter and receiver are tuned to the same carrier frequency. A message is transmitted from one antenna during time period 311a. The message, or a coded version of the message, is re-transmitted from another antenna during time 312a. The message is then transmitted on the first antenna during time 311b, and the message or the coded version of the message if a coded version was sent in time period 312a is repeated on the second antenna during time 312b, and so on. It is assumed that the receiver is usually turned off, for example, to save battery power, but is periodically turned on for a short window of time to scan for an incoming message. If the start of the receiver window 313 is not synchronized with the start of a message transmission, then in order for the receiver to be assured of potentially receiving at least one complete signal from each antenna, the length of the receiver window in time 315 is at least as long as a time period 316a and 316b equal to the complete repetition cycle on two antennas plus the time for one further transmission of the message. If the time of the start of the receiver's monitoring window 313 is not known to the transmitter, then the repetition cycles of a given message continues long enough to cover the total length of time for the receiver's turn on/turn off period. It should be noted that the repetitions of the message need not be contiguous in time. In fact, other messages intended for other portable receivers could be interleaved with the repetitions of a message intended for a specific portable receiver.

Figure 3B:
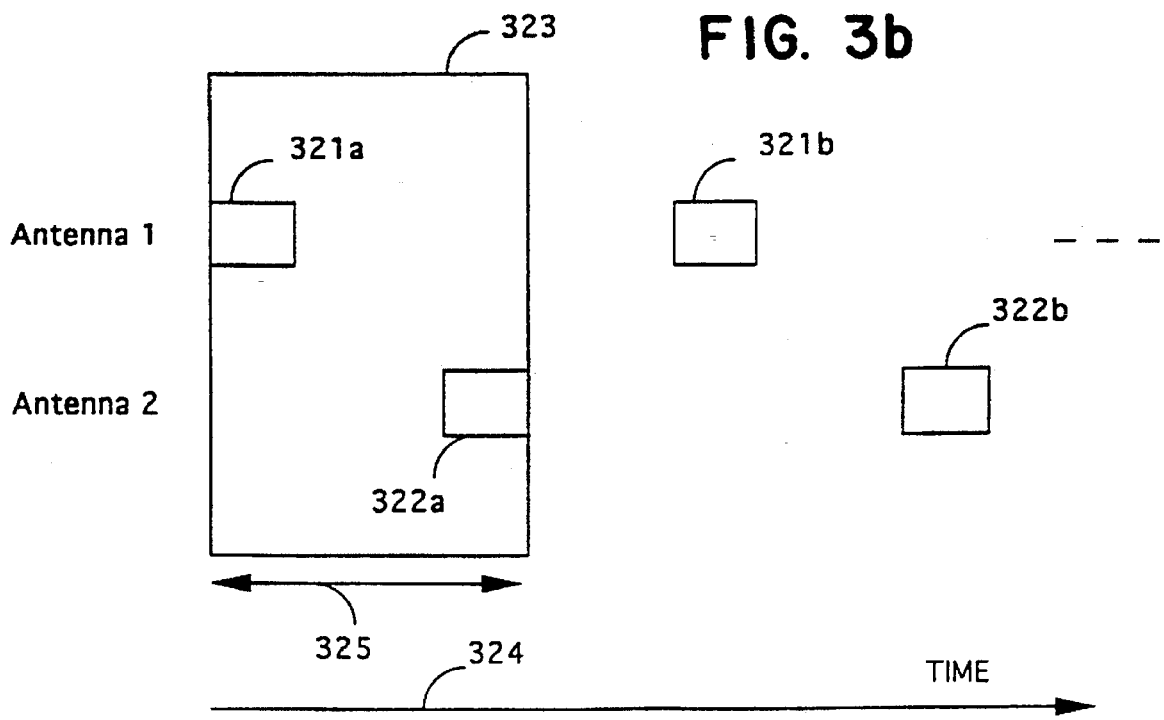
FIG. 3b is a timing diagram depicting the timing relationships between messages when the receiver is able to synchronize its monitoring window to the transmitter.

FIG. 3b shows the necessary timing relationship between transmitter and receiver for the same embodiment, but where the receiver is able to synchronize its monitoring window to the transmitter. In the diagram, the horizontal dimension 340 represents time. Both the transmitter and receiver are tuned to the same carrier frequency. In this case, a first message is sent from a first transmitting antenna during time period 321a. The message or a coded version of the message is then sent from a second transmitting antenna during time period 322a. The receiver's monitoring window 323 in this case begins at the same time as the message is first transmitted 321a. In this case, the length of the receiver's monitoring window 323 need only be equal to the length of one repetition cycle 325. This monitoring time is shorter than the period depicted in FIG. 3a, and hence a portable receiver can have improved battery life in this case. Furthermore, if the time where the receiver will be monitoring is known to the transmitter, no further retransmissions of the message are necessary. A new message (perhaps intended for a different portable receiver) may be sent in time periods 321b and 322b. The portable receiver may synchronize its monitoring window to the transmitter by observing the time in which a previous message was received and then starting a precision clock which counts in increments of repetition cycles. This and other methods by which a portable receiver may synchronize its monitoring window to a transmitter are well known to those skilled in the art and need not be elaborated here.

Figure 3C:
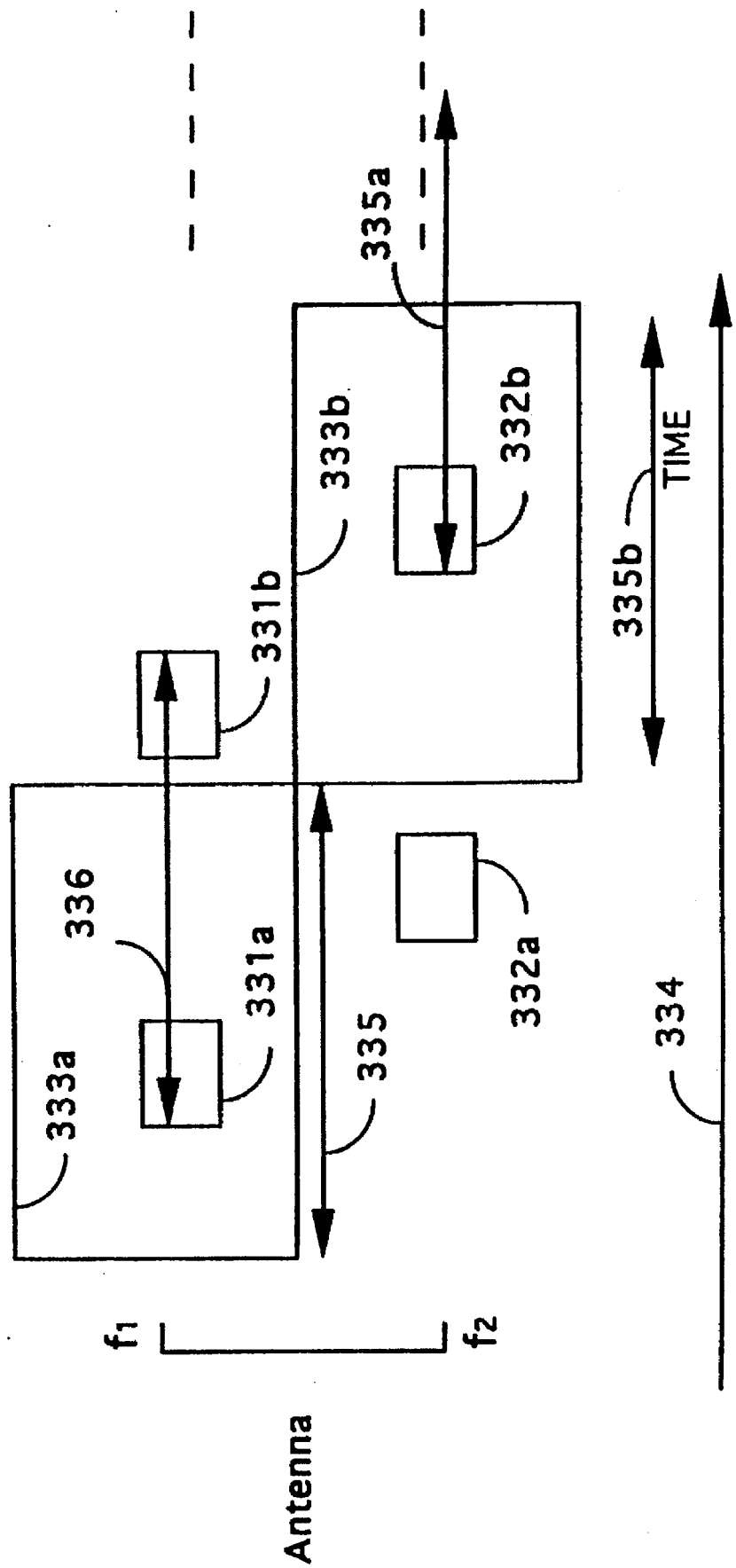
FIG. 3c is a timing diagram depicting the timing relationships between messages when using frequency diversity.

The necessary timing relationship between transmitter and receiver for the embodiment of FIG. 1d, wherein the message is transmitted on two different carrier frequencies is shown in FIG. 3c. In the diagram, the horizontal dimension 334 represents time. The transmitter sends the message on a first carrier frequency during time period 331a. It repeats the message, or sends a coded version of the message on a second carrier frequency during time period 332a. It then transmits the first message back on the first carrier frequency during time period 331b, and repeats the message or the coded version of the message if a coded version was sent during time period 332a on the second carrier frequency during time period 332b, and so on. When the start of the receiver window 333a for monitoring the first carrier frequency is not synchronized to the transmitter repetition cycle, then the receiver monitors the first carrier frequency for a period 335a of at least a time 336a equal to the length of a repetition cycle plus one transmission of the message. Similarly, the length 335b of the receiver window 333b for monitoring the second carrier frequency is at least a time 336b. As described for the embodiment shown in FIG. 3b, it is possible to reduce the length of the receiver's monitoring window if the receiver is synchronized to the start of a repetition cycle. It is also possible to remove the need for more than one repetition cycle of a message if the transmitter knows when the receiver's monitoring window begins.

Figure 3D:
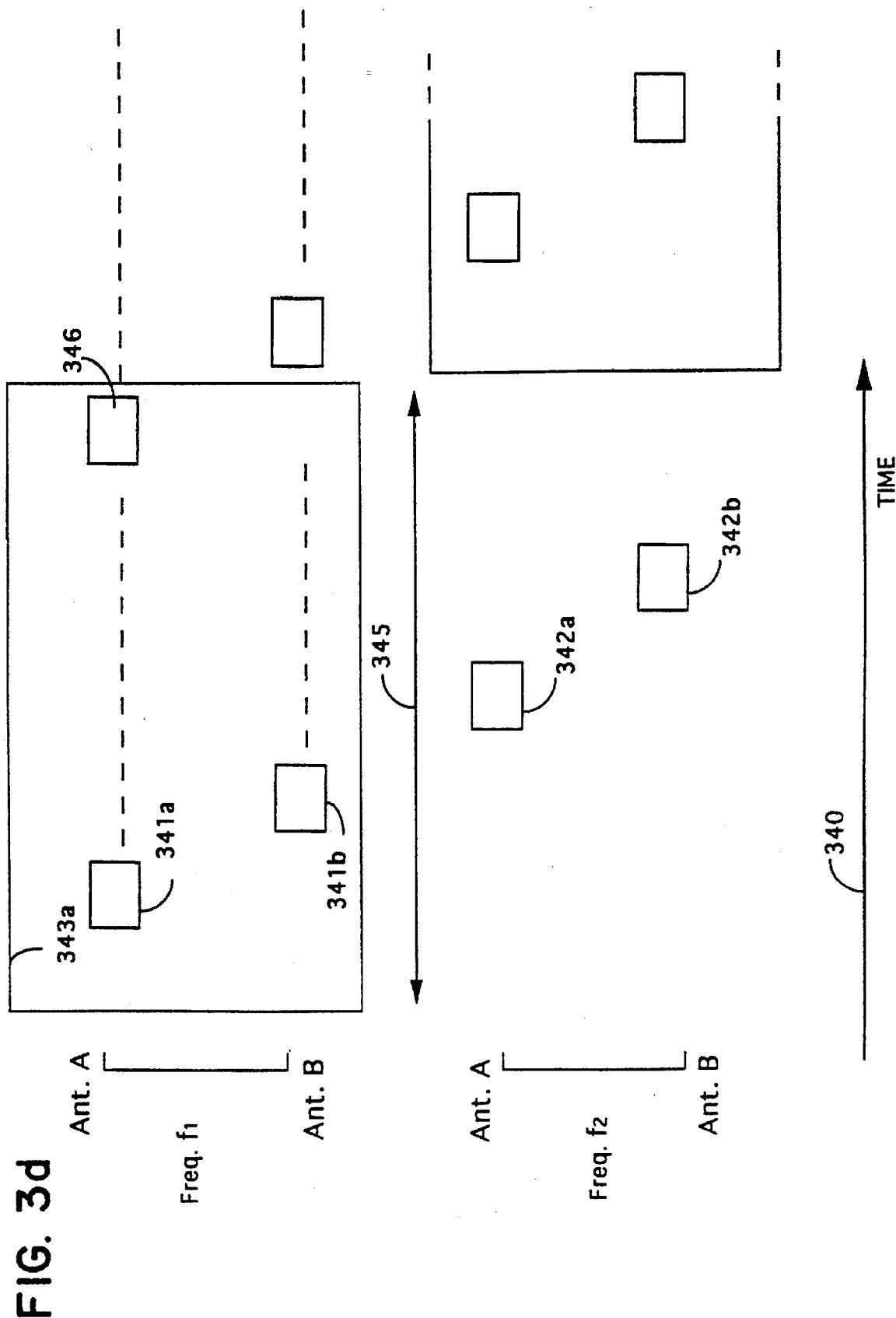
FIG. 3d, is a timing diagram depicting the timing relationships between messages when combining antenna and frequency diversity.

In FIG. 3d, we have shown a timing diagram depicting the timing relationships between messages when using antenna and frequency diversity. In this embodiment, frequency and antenna diversity is combined to provide a multiplicity of sequentially transmitted independently fading signals. In the diagram, the arrow 340 along the horizontal axis represents time and the vertical axis represents frequency, which is repeated for antenna A and antenna B, that is, each antenna can transmit on two frequencies, $f_1$ and $f_2$. In this embodiment, the message is sent via antenna A on carrier frequency $f_1$ during time period 341a, and the message, or a coded version of the message is then sent during time period 341b, via antenna B but on the same carrier frequency $f_1$. The message or a coded version of the message is then sent during time period 342a via antenna A but on the second carrier frequency $f_2$. The message or a coded version of the message is then sent during time period 342b via antenna B again on the second carrier frequency $f_2$. Thus, the mobile station can listen on the first carrier frequency for two transmissions of the message and the second carrier frequency for two transmissions of the message, and so on. This approach reduces the constraints on the hardware design of the mobile portable terminal since it reduces the number of times a switch occurs between frequencies. The other option is, of course, transmitting the same message via the first antenna on a first carrier frequency and repeating the message on the same antenna but on a second carrier frequency.

If the start of the receiver window 343a is not synchronized with the start of a message transmission 341a as in FIG. 3b, then the time span 345 of the receiver window 343 on carrier frequency $f_1$ is at least as long as a time period equal to the complete repetition cycle on two antennas and frequencies, i.e. transmissions 341a, 341b, 342a and 342b plus the time for one further transmission of the message 346. This is done in order for the receiver to be assured of potentially receiving at least one complete signal from each antenna and on each carrier frequency.

The teachings described above can be extended to embodiments wherein the message is sent n times either from n spatially separated and/or cross-polarized antennas. Similarly, the messages can be sent on n carrier frequencies or using a combination of the above to ensure n independent paths. In each case, the message, including the error detection bits, is coded according to a rate 1/n block forward error correcting code. The original message is sent on one path, and the coded versions of the message containing parity bits generated in the forward error correction coding process are then sequentially sent on the other n-1 paths.

Any one of these versions of the original message contains enough information to reconstruct the original message and to check that it has been received without error. Therefore, if any version of the message is received without error, the original message can be reconstructed successfully, as in the previous embodiments. However, in addition, even if each signal burst received contains some error, the error correction capability of the coding process can be used to reconstruct the original message, providing the errors are sufficiently few in number and suitably distributed.

When a coded version of the message is sent on successive transmissions, it is necessary for the receiver to know which coded version a given signal represents in order to properly apply the decoding process. This synchronization of the receiver to the code can be accomplished in various ways such as preceding one or more versions of the coded message with unique synchronization words, sending a given coded version of the message at a particular time with respect to a timing reference known to both transmitter and receiver, or sending a given coded version of the message on a given frequency in the case where multiple frequency diversity is employed. It is also possible to establish synchronization directly from the received messages themselves by examining the record of successes and failures resulting from making different assumptions about which version of the code is presently being transmitted and checking the assumption. These methods of establishing synchronization are straightforward to those skilled in the art and need not be elaborated here.

What is claimed is:

1. A method for sending a message from a radio transmitter to a radio receiver in a multipath environment, the method comprising:

encoding the message for error detection and for error correction before transmission;

transmitting the message from the radio transmitter to the radio receiver n times in n sequentially distinct radio transmissions, where n is an integer greater than one, each of the n sequentially distinct radio transmissions being transmitted on a respective radio channel, fading characteristics of each respective radio channel being statistically independent;

alternating the radio receiver between a reception mode in which the radio receiver is enabled to receive radio transmissions and a power-saving mode in which the radio receiver is disabled to reduce power consumption;

receiving the n sequentially distinct radio transmissions;

testing the n sequentially distinct radio transmissions for errors, including subjecting the n sequentially distinct received radio transmissions to error detection;

reconstructing the message from the n distinct radio transmissions, wherein the reconstructing comprises selecting an error-free one of the n sequentially distinct received radio transmissions; and applying error correction to reconstruct the message at the radio receiver when none of the distinct radio transmissions is error-free.

2. A method for sending a message from a radio transmitter to a radio receiver in a multipath environment, the method comprising:

encoding the message for error detection before transmission;

transmitting the message from the radio transmitter to the radio receiver n times in n sequentially distinct radio transmissions, where n is an integer greater than one, each of the n sequentially distinct radio transmissions being transmitted on a respective radio channel, fading characteristics of each respective radio channel being statistically independent;

alternating the radio receiver between a reception mode in which the radio receiver is enabled to receive radio transmissions and a power-saving mode in which the radio receiver is disabled to reduce power consumption;

receiving the n sequentially distinct radio transmissions;

testing the n sequentially distinct radio transmissions for errors, including subjecting the n sequentially distinct received radio transmissions to error detection; and reconstructing the message from the n sequentially distinct radio transmissions, wherein the reconstructing comprises selecting an error-free one of the n sequentially distinct received radio transmissions, and wherein the reconstructing, when none of the n sequentially distinct radio transmissions is error-free, comprises:

comparing the n sequentially distinct radio transmissions to one another on a bit-by-bit basis; and selecting bits which match in a majority of the n sequentially distinct radio transmissions to reconstruct the message on a bit-by-bit basis.

* * * * *